Figure 1:
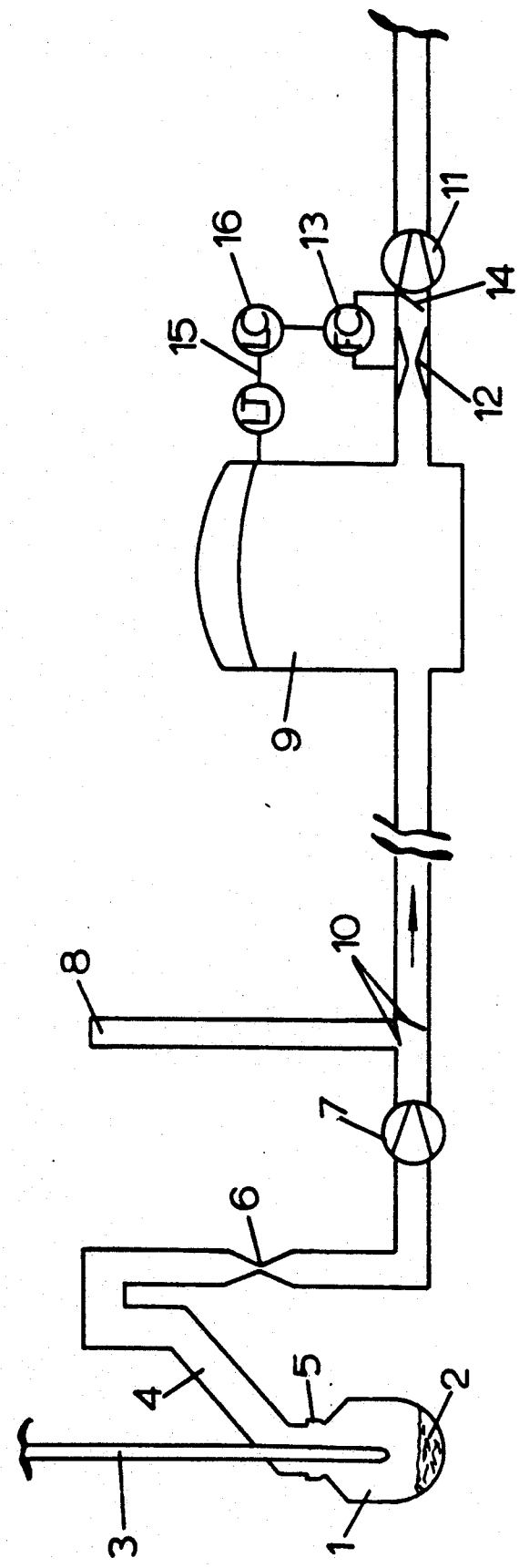

United States Patent [19]

van Ditzhuijzen

[11] Patent Number: 5,029,620

[45] Date of Patent: Jul. 9, 1991

[54] METHOD OF OPERATING A GAS RECOVERY SYSTEM AND APPARATUS FOR EMPLOYING THE METHOD

[75] Inventor: Gustaaf A. J. M. van Ditzhuijzen, Heemstede, Netherlands

[73] Assignee: Hoogovens Groep B.V., Netherlands

[21] Appl. No.: 836,720

[22] Filed: Mar. 6, 1986

[30] Foreign Application Priority Data

Mar. 11, 1985 [NL] Netherlands ............... 8500673

[51] Int. Cl.$^5$ ............................................. G06F 15/46
[52] U.S. Cl. ...................................... 141/1; 364/500; 137/2; 137/395; 141/98
[58] Field of Search ............... 75/59.13, 59.17, 59.18; 137/2, 8, 9, 12, 87, 101.25, 334, 391, 395; 261/DIG. 9; 266/80, 82, 83, 89, 156, 157, 158; 364/500; 141/98

[56] References Cited

U.S. PATENT DOCUMENTS

| | | | |
|---|---|---|---|
| 3,154,406 | 10/1964 | Allard | 137/2 X |
| 4,386,623 | 6/1983 | Funk et al. | 137/395 X |
| 4,482,969 | 11/1984 | Funk et al. | 364/500 |

Primary Examiner—Ernest G. Cusick
Attorney, Agent, or Firm—Stevens, Davis, Miller & Mosher

[57] ABSTRACT

A gas which is intermittently and/or irregularly released e.g. carbon monoxide-containing gas from an oxygen steel converter, is collected in a gas holder and delivered from the gas holder to a user installation. To avoid wastage of gas when the average release of gas varies and to permit use of a smaller gas holder, the output rate from the gas holder is determined by deriving a modified filling level signal by filtering a filling level signal of the gas holder so as to attenuate frequencies in the filling level signal above a predetermined limit frequency by a factor of at least ten, and adjusting the rate of delivery of the gas from a gas holder in dependence on variations in said modified filling level signal, such adjustment being in the same direction (up or down) as the variation in the modified filling level signal.

7 Claims, 1 Drawing Sheet

METHOD OF OPERATING A GAS RECOVERY SYSTEM AND APPARATUS FOR EMPLOYING THE METHOD

BACKGROUND OF THE INVENTION

1. FIELD OF THE INVENTION

This invention relates to a method of operating a gas recovery installation for a gas which is intermittently and/or irregularly released from a source, e.g. carbon monoxide-containing gas from an oxygen steel converter. The invention also relates to an apparatus for employing the method in the form of a steel converter having a gas recovery and distribution system

2. DESCRIPTION OF THE PRIOR ART

In the production of oxygen steel, liquid iron is brought into close contact with oxygen in a converter, in order to reduce the content of unwanted elements in the iron, especially carbon. During this production process, which is well known in the art, gas containing carbon monoxide, formed by carbon which is released from the liquid iron and reacts with the oxygen supplied, is produced.

In this specification an oxygen steel converter is to be understood to mean not only the standard L.D. converter, but also bottom blown variants of it, and combinations of top- and bottom-blown variants.

The nature of this process means that gas containing carbon monoxide is released irregularly. An installation with one converter, for example, produces gas for five to nine minutes after which the production of gas is very much reduced for forty to sixty minutes. In the case of an installation with two converters, the interval between the periods when most gas is released is between twenty and forty minutes. This gas containing carbon monoxide which is released has an important economic value which makes it viable not to flare this gas but to make use of it in user installations which can process it.

Because the user installations for this gas do not generally permit any wide variations in the gas supply, a gas holder from which gas can be supplied more regularly to consumption (user) installations is required. One problem with this, however, is that since the quantity of carbon monoxide-containing gas released may undergo a substantial change in the course of time, the capacity of the gas holder would have to be extremely high to accommodate this change fully. In practice the dimensions of the gas holder are subject to limitations which are determined mainly by investment costs, which are higher for larger gas holders.

One possible result of this is that if the average gas supply over a certain period of time is greater than the average consumption level of the consumption installations, the gas holder will fill and the gas recovered will have to be flared off. The economic value of this gas is therefore lost. If the average gas supply over a specific period of time is lower than the average consumption level, the gas holder cannot continue to supply sufficient gas to the consumption installation after a period of time. As a result they must be shut down, leading to production loss and stoppage costs.

SUMMARY OF THE INVENTION

The object of the invention is to provide a method which solves or ameliorates these problems, and in particular can maintain an adequate gas supply to one or more user installations from a gas recovery system.

The method according to the invention involves the steps of:

(a) collecting the released gas in gas holding means, and (b) delivering the gas from the gas holding means to at least one gas consumption installation, the method being characterized by (c) obtaining a filling level signal representative of the quantity of gas in said gas holding means (d) deriving a modified filling level signal by subjecting said filling level signal to filtering so as to attenuate frequencies in said filling level signal above a predetermined limit frequency by a factor of at least ten, (e) adjusting the rate of delivery of the gas from a gas holding means in step b) in dependence on variations in said modified filling level signal, such adjustment being in the same direction (up or down) as the variation in the modified filling level signal.

Practical experience gained in operating a gas recovery system has led to the realisation that keeping the flow rate completely constant is not always required under all circumstances, contrary to what was previously believed.

If the gas to be recovered is supplied into a gas mains, it has been shown that adapting the flow rate by the method of the invention does not give rise to any impermissible disturbances in the pressure level or calorific value for the consumer(s) connected to this gas mains.

By this invention, an economic advantage may be gained in two ways. Firstly, the frequency at which and time during which a surplus of gas is flared have been reduced as much as possible. Secondly stoppage losses from connected consumers have been counteracted because, as the average gas supply decreases, the flow rate from the gas holder can be adapted by the method described without difficulties.

These advantages can be achieved both in existing installations for operating a gas recovery system, and in installations newly built. For new installations, a further advantage gained is that the investment costs for the gas holder may be lower.

Preferably, in step (e) the said rate of delivery is adjusted proportionally to said variations in said modified filling level signal. The advantage of this is that the consumption installations which receive the gas ca be adapted gradually to the modified gas supply.

Alternatively, in step (e), for variations of the modified filling level signal of frequency above a predetermined frequency value said rate of delivery is adjusted proportionally to the variations of the modified filling level signal, and for variations of the modified filling level signal of frequency below said predetermined frequency value said rate of delivery is adjusted by a amount more than proportional to the variation of the modified filling level signal.

A more than proportional increase or reduction in the desired value of the flow rate can be achieved by increases or reductions in the modified filling level signal for frequencies below a maximum frequency. This means that faster adaptation of the outflow rate is achieved for somewhat longer deviations in the gas supply, thereby providing more efficient use of the gas holder volume.

The accuracy with which the flow rate from the gas holder is adapted to the variation in gas supply is assisted in particular by allowing the variation in the proportion by which the desired value of the flow rate is adapted to depend, in inverse proportion, on the frequency content of the modified filling level signal. In particular, it is then preferred that in step (e) the rate of delivery is determined in accordance with the equation $$F_{des} = K_1(V_{des} - V_{mod}) + K_2 \int (V_{des} - V_{mod}) dt$$

where $F_{des}$ = rate of delivery
$V_{des}$ = setpoint filling level signal
$V_{mod}$ = modified filling level signal
$K_1$ and $K_2$ are predetermined constants.

The said predetermined limit frequency of the modified filling level signal is in practice preferably chosen equal to the inverse of twice the cycle time of gas release, i.e. is equal to ½T where T is the period length of the cycle during which no gas is released.

Using this method appears to enable savings to be made in the investment costs by ensuring that the dimensions of the gas holder correspond to an incoming and outgoing calculated flow rate which is 90% of the actual incoming and outgoing flow rate.

Thus in another aspect, the invention provides apparatus in which the method of the invention is to be employed, comprising at least one converter for steelmaking, at least one oxygen lance for blowing oxygen onto the liquid iron in the converter, a flaring device for excess gas from the converter, a gas holder, a pipe system by which the released gas, containing carbon monoxide, is fed to the flaring device and the gas holder, a pipe system by which gas is fed from the gas holder to one or more gas consumers, and means for setting the flow rate from the gas holder to a desired value, the dimensions of the gas holder being determined according to the predicted value of the flow rate in and out of the gas holder, characterised in that the dimensions of the gas holder are determined in accordance with a modified value of the average flow rate in and out of the gas holder, which modified value is 90% of said predicted value.

DESCRIPTION OF THE DRAWING AND PREFERRED EMBODIMENT

The invention will be illustrated in further detail below with reference t the accompanying drawing, which shows the preferred embodiment of the invention.

The FIGURE shows a converter 1, in which liquid iron 2 is present, which is to undergo treatment with oxygen. For this purpose an oxygen lance 3 is positioned above the liquid iron 2 whereupon the blowing in of the oxygen can commence.

The gas released during blowing, which consists predominantly of carbon monoxide is led into a shaft 4 by allowing an apron 5 to drop over the mouth of the converter 1. This considerably suppresses the combustion of the gas containing the carbon monoxide. After passing through the shaft 4, the gas flows through a so-called venturi washer 6, which is used to clean the gas. The pressure difference to ensure that the gas flows in this direction, is applied by means of a fan 7, after which the gas can be processed further in two different ways.

These two methods of processing are flaring the gas off at a surplus gas burner 8, in which case there is inefficiency, and storage in a gas holder 9. These two methods of processing exclude each other because coupled valves 10 only permit one of the two processing methods.

Apart from the fact that both processing methods can take place during blowing of the oxygen, it is also possible to exchange the processing methods during blowing. This is done particularly at the beginning and end of a blowing period. Both at the beginning and the end of the blowing period the quality of the gas containing carbon monoxide is too low for it to be further processed efficiently. In this case flaring should be carried out by mean of the surplus gas burner 8. After an initial period of the blowing, the calorific value of the gas is sufficient, and the coupled valves 10 are reversed so that the gas holder 9 is filled with gas which can be usefully employed. From the gas holder 9, fan 11 ensures a flow in the direction of the consumer installation(s) which are not shown in more detail in the FIGURE.

This flow rate is regulated by the control circuit, which is formed by a measuring recorder 12 which may, for example, be a measuring flange or a venturi flow regulator 13, and an inlet blade valve 14. A different resistance characteristic for fan 11 can be set by the inlet blade valve 14 so that the flow rate can be adjusted.

The method is based on deriving the desired value supplied to the flow regulator 13 from a filling level signal 15. For this purpose the filling level signal 15 is processed in a computer 16 in such a way that the desired flow rate value supplied to the flow regulator 13 is adapted to the filling level of the gas holder. This adaptation is effected by increasing or reducing the value of the flow rate in the same direction (up or down) as variations in a modified filling level signal obtained in computer 16 by filtering the filling level signal 15. This modified filling level signal consists of the filling level signal 15 in which frequencies above a limit frequency are attenuated by a minimum factor of ten.

In one example of the invention gas extracted from the process of steelmaking in an oxygen blowing steelplant, i.e. a converter, is recovered and stored in a gasholder. From this gasholder the gas is injected into a pipeline transporting blast furnace gas, by means of a booster fan. This injection is controlled by an algorithm that optimizes the use of the gasholder.

A lot of energy is then saved by avoiding flaring of the gas, which would occur with a full gasholder. The process of steelmaking in an oxygen blowing steelplant causes in every so-called heat a large amount of gas to be pumped into the gasholder in a very short time. A flow with less variation can then be fed from this gasholder into the blast furnace gas line.

Using the method according to the invention, it is possible to optimize the flow into the blast furnace gas line, to minimize flares and to require a smaller gasholder.

It is of importance to take into account the shape of the gas flow from the converter, and the movement of the piston of the gasholder. The flow from the converter usually is a square wave function and the movement of the piston can be represented by a saw tooth wave function. The frequency of this last wave function is the inverse of the tap to tap time, which is the interval time of the steelmaking process.

The following variations can occur: Tap to tap time

---

Tap to tap time

| -continued | |
| --- | --- |
| one converter practice | 40–60 min. |
| two converter practice | 20–40 min. |
| gas recovery time | 5–9 min. |
| gas flow from the process | 200,000–288,000 m³/hour |

As described above, the method involves modifying the resulting filling level signal of the gasholder, using this modified signal for adaptation of the gas flow rate into a blast furnace gas line, thereby reducing the amount of flaring and allowing a stable operation of both the gas recovery system and the gas-consumer devices connected to the blast furnace gas line. If there is one converter and the tap to tap time amounts to 50 minutes, the predetermined limit frequency of the gasholder filling level signal is the inverse of twice the tap to tap time which equals $1/100$ min$^{-1}$. Frequencies above this value are attenuated by a factor of at least ten, to produce the modified filling level signal used to control the gas flow rate from the gas holder.

What is claimed is:

1. In a method of recovering intermittently and/or irregularly released gas from an oxygen steel converter, comprising the steps of
   (a) collecting the released gas in gas holding means, and
   (b) delivering the gas from the gas holding means to at least one gas consumption installation, the improvement of
   (c) obtaining a filling level signal representative of the quantity of gas in said gas holding means
   (d) deriving a modified filling level signal by subjecting said filling level signal to filtering so as to attenuate frequencies in said filling level signal above a predetermined limit frequency by a factor of at least ten,
   (e) adjusting the rate of delivery of the gas from a gas holding means in step b) in dependence on variations in said modified filling level signal, such adjustment being in the same direction (up or down) as the variation in the modified filling level signal.

2. A method according to claim 1 wherein in step (e) the said rate of delivery is adjusted proportionally to said variations in said modified filling level signal.

3. A method according to claim 1 wherein, in step (e), for variations of the modified filling level signal of frequency above a predetermined frequency value said rate of delivery is adjusted proportionally to the variations of the modified filling level signal, and for variations of the modified filling level signal of frequency below said predetermined frequency value said rate of delivery is adjusted by an amount more than proportional to the variation of the modified filling level signal.

4. A method according to claim 3 wherein in step (e) the rate of delivery is determined in accordance with the equation $$F_{des} = K_1(V_{des} - V_{mod}) + K_2 \int (V_{des} - V_{mod}) dt$$

where
  $F_{des}$ = rate of delivery
  $V_{des}$ = setpoint filling level signal
  $V_{mod}$ = modified filling level signal
  $K_1$ and $K_2$ are predetermined constants.

5. A method according to claim 1 wherein the release of gas from the source is cyclical and said predetermined limit frequency of step (d) is equal to $$\tfrac{1}{2}T$$

where T is the period length of the cycle during which no gas from the source is released.

6. A method according to claim 2 wherein the release of gas from the source is cyclical and aid predetermined limit frequency of step (d) is equal to $$\tfrac{1}{2}T$$

where T is the period length of the cycle during which no gas from the source is released.

7. A method according to claim 3 wherein the release of gas from the source is cyclical and said predetermined limit frequency of step (d) is equal to $$\tfrac{1}{2}T$$

where T is the period length of the cycle during which no gas from the source is released.

* * * * *